(No Model.)
J. G. GAY.
TWO WHEELED VEHICLE.
No. 337,258. Patented Mar. 2, 1886.
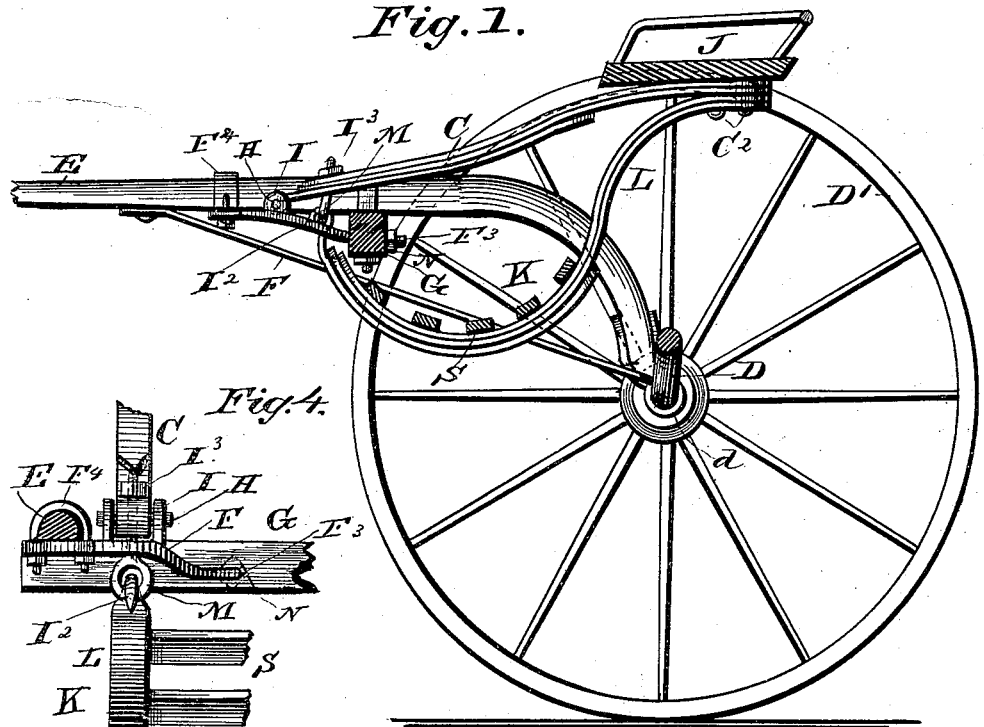
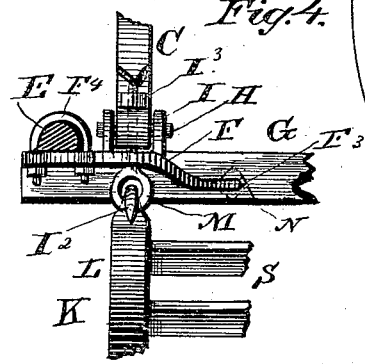
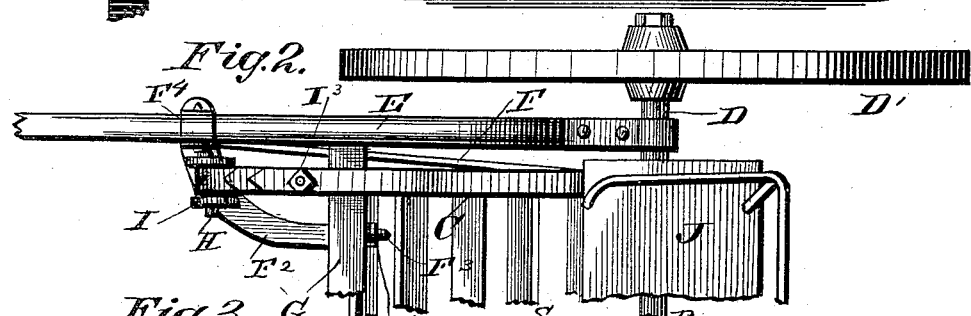
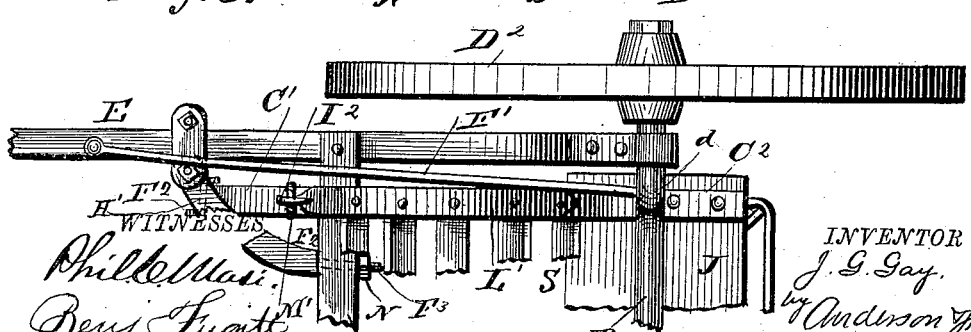
WITNESSES
Phill C. Mau.
Benj Fugitt
INVENTOR
J. G. Gay.
by Anderson Smith
his Attorneys

UNITED STATES PATENT OFFICE.

JOSHUA G. GAY, OF OTTAWA, ILLINOIS.

TWO-WHEELED VEHICLE.

SPECIFICATION forming part of Letters Patent No. 337,258, dated March 2, 1886.

Application filed January 9, 1886. Serial No. 188,121. (No model.)

*To all whom it may concern:*

Be it known that I, JOSHUA G. GAY, a citizen of the United States, residing at Ottawa, in the county of La Salle and State of Illinois, have invented certain new and useful Improvements in Road-Carts; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a vertical longitudinal section. Fig. 2 is a detail view. Fig. 3 is a detail view. Fig. 4 is a detail view.

This invention relates to road-carts; and it consists in the construction and novel combination of parts, as hereinafter set forth, and pointed out in the claims.

Referring by letter to the accompanying drawings, D designates the axle of the vehicle, which axle is curved or bent upwardly between its journals, and $D'$ $D^2$ are the wheels mounted on the journals of the axle in the usual manner.

E designates the shafts, which are curved downwardly at their rear ends, and are rigidly connected to the axle D near the inner ends of the wheel-hubs.

F F' are inclined brace-rods, which are bolted at their forward and upper ends to the under faces of the shafts E, and extend downwardly and rearwardly, and are connected at their lower ends to the axle D, between and near to the wheel-hubs, by clips $d$, or in any other suitable convenient manner.

G designates the cross-bar by which the shafts are connected and strengthened in front of the axle and seat.

C C' designate springs composed of three or more leaves each, which springs are connected at their forward ends, between the eyes I I' of the shackle-braces $F^2$ $F^2$, by bolts H H', and at their rear ends said spring, C C' are secured to the under face of the seat J, at the ends thereof, by bolts.

The foot-rest K is composed of the end supports, L L', which are curved downwardly intermediately of their front and rear ends, and are secured to the under faces of the springs C C' by the same bolts $C^2$ that secure the seat J to the springs C C'. The forward ends of the downwardly-curved supports L L' are provided with hooks $I^2$ $I^2$, which are connected to the springs C C', near the eyes I I' of the latter, by ring-bolts M M', the rings of which engage the hooks $I^2$ $I^2$, the stems of said ring-bolts being secured in place in the springs C C' by nuts $I^3$ at the upper ends of the stems of said bolts M M'. The forward ends of the shackle-braces $F^2$ $F^2$ are secured to the shafts by clips $F^4$, and the rear ends of said shackle-braces have threaded ends $F^3$, which threaded ends are passed through the cross-bar G at short distances from its ends, and are held in place by nuts N, screwed onto the rear ends of said shackle-braces. To the downwardly-curved end supports, L L', transverse parallel slats S are secured to complete the foot-rest. In this manner I produce a two-wheeled vehicle having long curved steel springs, to which the body or seat and the foot-rest are attached, but not connected directly to the axle-tree or shafts, but are coupled to shackles that also form braces from the shafts to the cross-bar.

Having described this invention, what I claim, and desire to secure by Letters Patent, is—

1. In a road-cart, the combination, with the shafts and cross-bar, of the shackle-braces $F^2$ $F^2$, the springs C C', and the seat, substantially as specified.

2. In a road-cart, the combination, with the shafts connected rigidly to the axle and strengthened by the cross-bar, of the shackle-braces having eyes intermediate of their ends on their upper faces, the springs secured at their forward ends between said eyes by bolts, the seat secured upon said springs near the rear ends, and the curved supports and slats forming the foot-rest, substantially as specified.

3. The combination, with the shafts, axle, and cross-bar, of the brace-rods connecting the shafts and axle, the shackle-braces connecting the shafts and cross-bar, the springs connected to the shackle-braces and supporting the seat, and the curved end supports of the foot-rest secured to the springs C C' by nut-bolts and eyebolts, substantially as specified.

In testimony whereof I affix my signature in presence of two witnesses.

JOSHUA G. GAY.

Witnesses:
JAS. MCMANUS,
JOHN C. MCKEON.